Patented Sept. 11, 1945

2,384,569

UNITED STATES PATENT OFFICE 2,384,569

COPOLYMERS OF DIENES AND OLEFINIC DICARBOXYLIC ACID ESTERS

Waldo L. Semon, Silver Lake, Ohio, assignor to The B. F. Goodrich Company, New York, N. Y., a corporation of New York No Drawing. Application March 5, 1940, Serial No. 322,382

12 Claims. (Cl. 260—78)

This invention relates to new, rubber-like polymerization products derived from conjugated aliphatic dienes and olefin dicarboxylic acid esters, and to a method of preparing the same.

It has long been known that conjugated aliphatic dienes such as isoprene, butadiene, dimethyl butadiene and the like will undergo polymerization to form elastic vulcanizable masses resembling natural rubber in many of their properties. However, such polymers have never attained any widespread commercial success as natural rubber substitutes because of the difficulties attending their manufacture and the inferior quality of rubber goods produced therefrom.

More recently, processes have been developed whereby synthetic rubber-like materials of improved properties are obtained by the copolymerization of conjugated dienes, principally butadiene, with some other polymerizable substance. The compounds which have heretofore been used for conjoint polymerization with dienes generally contain in their molecules the polymerizable vinyl grouping, $H_2C=CH-$, and have attached thereto a negative substituent such as a phenyl, carboxyl or carbonyl group. As examples of this type of vinyl compound which have been polymerized with butadiene may be cited; styrene, vinyl ethyl ketone, acrylonitrile, acrylic acid and acrylic and methacrylic esters.

I have now discovered that conjugated dienes may also be copolymerized with other compounds containing an olefinic linkage

and having attached to each of the doubly-bound carbon atoms a negative substituent, namely a carboxylic acid or ester group. Although it is generally believed that such compounds containing a negative substituent on each ethylenic carbon do not polymerize readily the olefin dicarboxylic acid esters are an exception to this rule being capable of undergoing polymerization alone or, as in the present invention, when admixed with other polymerizable compounds.

According to the present invention an olefin dicarboxylic acid or ester of the general formula

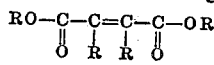

wherein each R may represent a hydrogen or alkyl radical, may be polymerized in admixture with a conjugated diene of the formula

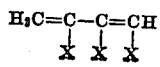

wherein each X represents hydrogen or methyl, to yield valuable soft rubber-like copolymers. Inasmuch as maleic acid and fumaric acid are the only olefin dicarboxylic acids commercially available, the invention will be described in particular relation thereto but it is understood that other olefin dicarboxylic acids such as methyl maleic acid (citraconic acid) and methyl fumaric acid (mesaconic acid) are also operable. Likewise, the ethyl esters of these acids are to be preferred for commercial use in the practice of this invention, although other esters such as methyl, propyl, butyl and the like may also be employed. As the other component of the polymerizable mixture, i. e. the conjugated diene, such compounds as isoprene, butadiene, dimethyl butadiene, piperylene and the like or mixtures of these may be utilized but it is is preferred to imploy butadiene since the quality of the rubber produced therefrom is most desirable and also since butadiene is less costly and is commercially available.

The rubber-like coploymers of the present invention have a decided advantage over simple diene polymers or copolymers of dienes with vinyl compounds in that they are softer and more plastic and may be milled on ordinary rubber machinery with great ease, this property adapting them to a variety of uses in the rubber industry.

The proportions of the diene and the dicarboxylic acid or ester to be used in polymerization processes may be varied over wide limits. However, in order that the rubber-like properties of the polymerizates be the most pronounced, I have found it advisable to employ mixtures containing at least 50% by weight of the conjugated diene. Polymerizates containing larger proportions of the dicarboxylic acid or ester tend to be liquid, or semi-liquid in character while polymerizates containing from about 50 to 70% of diene are soft, tacky, plastic materials. Specifically, therefore, I prefer to employ a mixture such as that consisting of 70–80% butadiene and 20–30% diethyl maleate. Copolymers containing still larger proportions of butadiene may also be prepared but, generally, such polymers suffer from a loss of plasticity, softness and tackiness as the proportion of butadiene increases.

A number of processes may be used for polymerizing the mixtures of dienes and olefin dicarboxylic esters. For example, polymerization may be effected by the application of heat, actinic light or pressure to the mixture either alone or in the presence of a solvent and either with or without the presence of a polymerization catalyst.

However, it is preferred to carry out the polymerization in the form of an emulsion with a nonsolvent liquid, such as water, and in the presence of a suitable emulsifying agent and, if desired, polymerization catalyst. The emulsifying agents ordinarily used in emulsion polymerization processes as hymolal sulfates or sulfonates or aromatic sulfonic acids or derivatives thereof, for example, sodium isopropyl beta-naphthalene sulfonate, sodium butyl alpha-naphthalene sulfonate or tetrahydro-naphthalene beta-sulfonic acid; salts of high molecular weight organic bases, for example, the hydrochloride of diethylaminoethyloleylamide or cetyltrimethylammonium methyl sulfate; salts of fatty acids, for example, sodium oleate, sodium palmitate or sodium linoleate; or some other emulsifying agent may be used. In order to speed up the polymerization process it has been found desirable to add a polymerization catalyst such as benzoyl peroxide, diazoaminobenzene, dipotassium diazomethanedisulfonate, potassium persulfate, hydrogen peroxide and the like or hydrogen peroxide plus some substance which forms an addition compound with hydrogen peroxide such as sodium pyrophosphate, sodium oxalate, urea, glycine, alanine and the like. In some instances it may be desirable to add other ingredients, which exert a favorable influence on the polymerization process, or which improve the properties of the copolymer.

Polymerization of the emulsion is preferably carried out at temperatures between 30° C. and 70° C. for periods from 40 to 100 hours and, preferably, with continued shaking or stirring. The polymerization products are then obtained in the form of a milky emulsion resembling rubber latex to which antioxidants or age-resistors such as phenyl beta naphthylamine may be added, if desired and which may be coagulated by the methods ordinarily used to coagulate rubber latices, for example, by freezing out, by addition of acid, alcohol or salts or by a combination of these methods. After coagulation the polymerization products are separated from the emulsion, washed and dried, whereby they are obtained as soft plastic and elastic rubber-like masses.

The copolymerization products may be worked on standard rubber processing machinery and may be compounded with fillers, softeners, and vulcanizing ingredients in much the same manner as with natural rubber. These products may also be vulcanized or cured and, depending upon the compounding and vulcanizing conditions, a variety of vulcanizates may be obtained.

The copolymers of the present invention may also be mixed with natural rubber or other synthetic rubber-like copolymers and, in the latter case, this procedure performs a very useful function in that other rubber-like copolymers are rendered much more plastic and more easily compounded.

It is also possible to add polymerizable vinyl compounds such as acrylonitrile or styrene to the mixture of the diene hydrocarbon and the olefin dicarboxylic ester before polymerization occurs, the result being that copolymers are obtained which combine the valuable chemical and solvent resistance of copolymers containing dienes and styrene or acrylonitrile with the plasticity of copolymers containing dienes and olefin dicarboxylic esters.

Although I have described my invention at some length, it may be illustrated by the following specific example which is not in any way intended to limit the invention thereto.

*Example*

An emulsion containing 75 parts by weight of butadiene, 25 parts by weight of diethyl maleate, 200 parts of a 5% aqueous solution of the hydrochloride of diethylaminoethyloleylamide, and 2 parts of benzoyl peroxide is agitated for three days at a temperature of 60° C. Thus is obtained a latex-like mass, from which by coagulation with alcohol a soft tacky mass separates. After washing and drying, this coagulum may be processed with great ease on an ordinary two roll mixing mill and when compounded and vulcanized in the usual manner, vulcanizates of desirable properties may be obtained.

It is evident to those skilled in the art that numerous details may be varied through a wide range without departing from the principles of this invention as defined in the appended claims.

I claim:
1. A process which comprises copolymerizing in aqueous emulsion a mixture including a conjugated diene of the general formula

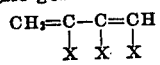

wherein each X represents a member of the class consisting of hydrogen and methyl and a compound of the formula

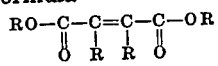

wherein each R represents a member of the class consisting of hydrogen and alkyl.

2. A process which comprises copolymerizing in aqueous emulsion in the presence of an emulsifying agent and an emulsion polymerization catalyst a mixture containing a conjugated diene of the general formula

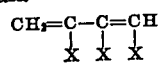

wherein each X represents a member of the class consisting of hydrogen and methyl, and a compound of the formula

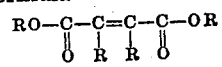

wherein each R represents a member of the class consisting of hydrogen and alkyl.

3. A process which comprises copolymerizing in aqueous emulsion a mixture containing butadiene and a compound of the formula

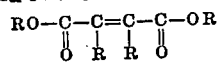

wherein each R represents a member of the class consisting of hydrogen and alkyl.

4. A process which comprises emulsifying a mixture containing butadiene and a compound of the formula

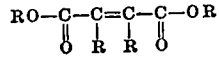

wherein each R represents a member of the class consisting of hydrogen and alkyl, with water in the presence of an emulsifying agent and an emulsion polymerization catalyst, and copolymerizing the emulsion thus formed.

5. A process which comprises copolymerizing in aqueous emulsion a mixture including butadiene and diethyl maleate.

6. A process which comprises copolymerizing in aqueous emulsion a mixture including butadiene and diethyl maleate, said mixture containing at least 50% by weight of butadiene.

7. A process which comprises copolymerizing in aqueous emulsion a mixture including a conjugated diene of the general formula $$CH_2=C-C=CH$$
$$\phantom{CH_2=}X\phantom{-}X\phantom{\ }X$$

wherein each X represents a member of the class consisting of hydrogen and methyl and a compound of the formula $$RO-C-C=C-C-OR$$
$$\phantom{RO-}\|\phantom{-}|\phantom{\ }|\phantom{\ }\|$$
$$\phantom{RO-}O\phantom{-}R\phantom{\ }R\phantom{\ }O$$

wherein each R represents a member of the class consisting of hydrogen and alkyl, said mixture containing at least 50% by weight of the conjugated diene.

8. A product which includes a copolymer derived by the polymerization in aqueous emulsion of a mixture including a conjugated diene of the general formula $$CH_2=C-C=CH$$
$$\phantom{CH_2=}X\phantom{-}X\phantom{\ }X$$

wherein each X represents a member of the class consisting of hydrogen and methyl and a compound of the formula $$RO-C-C=C-C-OR$$
$$\phantom{RO-}\|\phantom{-}|\phantom{\ }|\phantom{\ }\|$$
$$\phantom{RO-}O\phantom{-}R\phantom{\ }R\phantom{\ }O$$

wherein each R represents a member of the class consisting of hydrogen and alkyl.

9. A product which includes a copolymer derived by the polymerization in aqueous emulsion of a mixture including a conjugated diene of the general formula $$CH_2=C-C=CH$$
$$\phantom{CH_2=}X\phantom{-}X\phantom{\ }X$$

wherein each X represents a member of the class consisting of hydrogen and methyl and a compound of the formula $$RO-C-C=C-C-OR$$
$$\phantom{RO-}\|\phantom{-}|\phantom{\ }|\phantom{\ }\|$$
$$\phantom{RO-}O\phantom{-}R\phantom{\ }R\phantom{\ }O$$

wherein each R represents a member of the class consisting of hydrogen and alkyl, said mixture containing at least 50% by weight of the conjugated diene.

10. A product which includes a copolymer derived by the polymerization in aqueous emulsion of a mixture including butadiene and diethyl maleate.

11. A product which includes a copolymer derived by the polymerization in aqueous emulsion of a mixture of butadiene and diethyl maleate, said mixture containing at least 50% by weight of butadiene.

12. A product which includes a copolymer derived by polymerization in aqueous emulsion of a mixture of 75 parts by weight of butadiene and 25 parts by weight of diethyl maleate.

WALDO L. SEMON.